United States Patent
Tamura et al.

(10) Patent No.: US 10,387,190 B2
(45) Date of Patent: Aug. 20, 2019

(54) SYSTEM AND METHOD OF EXECUTING A PLURALITY OF THREADS USING THREAD SWITCHING ON EXECUTION TIME-OUT USING INSTRUCTION RE-WRITE

(71) Applicant: FUJITSU LIMITED, Kawasaki-shi, Kanagawa (JP)

(72) Inventors: Yuto Tamura, Kawasaki (JP); Kohta Nakashima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 435 days.

(21) Appl. No.: 15/139,991

(22) Filed: Apr. 27, 2016

(65) Prior Publication Data

US 2016/0328232 A1  Nov. 10, 2016

(30) Foreign Application Priority Data

May 8, 2015 (JP) ................................. 2015-095939

(51) Int. Cl.
*G06F 9/46* (2006.01)
*G06F 9/30* (2018.01)
(Continued)

(52) U.S. Cl.
CPC .............. *G06F 9/46* (2013.01); *G06F 9/3009* (2013.01); *G06F 9/3851* (2013.01); *G06F 9/4843* (2013.01)

(58) Field of Classification Search
CPC .............................. G06F 9/3009; G06F 9/4843
See application file for complete search history.

(56) References Cited

U.S. PATENT DOCUMENTS 6,567,839 B1  5/2003  Borkenhagen et al.
6,697,935 B1  2/2004  Borkenhagen et al.
(Continued)

FOREIGN PATENT DOCUMENTS

JP  2001-521215  11/2001
JP  2001-521216  11/2001
(Continued)

OTHER PUBLICATIONS

Roved Love, "Linux System Programming," 2nd Ed., May 29, 2013, O'Reilly Media, Inc. 2 pages. (Year: 2013).*
(Continued)

*Primary Examiner* — Yuqing Xiao
(74) *Attorney, Agent, or Firm* — Xsensus LLP

(57) ABSTRACT

A system includes circuitry configured to execute a first thread of a plurality of threads, measure an execution time period during which the circuitry executes the first thread without executing other threads of the plurality of threads, determine whether the measured execution time period exceeds a threshold value, specify first address information of a first instruction which is included in the first thread when it is determined that the measured execution time period exceeds the threshold value, the first instruction being an instruction that is scheduled to be executed, exchange the first instruction stored in an address region specified by the first address information with a second instruction instructing the circuitry to switch from executing the first thread to executing a second thread of the plurality of threads, and switch from executing the first thread to the executing the second thread by executing the second instruction.

17 Claims, 13 Drawing Sheets

(51) Int. Cl.
*G06F 9/38* (2018.01)
*G06F 9/48* (2006.01)

(56) References Cited

U.S. PATENT DOCUMENTS

| | | | | |
|---|---|---|---|---|
| 7,165,254 | B2* | 1/2007 | Yoshida | G06F 9/325 |
| | | | | 712/241 |
| 7,213,137 | B2* | 5/2007 | Boom | G06F 9/30174 |
| | | | | 710/264 |
| 7,581,085 | B1* | 8/2009 | Koryakin | G06F 9/45504 |
| | | | | 712/220 |
| 2003/0018685 | A1* | 1/2003 | Kalafatis | G06F 9/3802 |
| | | | | 718/102 |
| 2004/0025160 | A1* | 2/2004 | Dice | G06F 9/485 |
| | | | | 718/102 |
| 2005/0066150 | A1* | 3/2005 | Mehta | G06F 9/485 |
| | | | | 712/205 |
| 2005/0125802 | A1* | 6/2005 | Wang | G06F 9/3009 |
| | | | | 718/108 |
| 2007/0180438 | A1* | 8/2007 | Suba | G06F 8/4441 |
| | | | | 717/151 |
| 2009/0172361 | A1* | 7/2009 | Holloway | G06F 9/3851 |
| | | | | 712/220 |

FOREIGN PATENT DOCUMENTS

| | | |
|---|---|---|
| JP | 2006-40142 A | 2/2006 |
| JP | 2006-172229 A | 6/2006 |

OTHER PUBLICATIONS

Office Action dated Nov. 6, 2018 in Japanese Patent Application No. 2015-095939, citing documents AO and AP therein, 8 pages (with English language translation).

\* cited by examiner

SYSTEM AND METHOD OF EXECUTING A PLURALITY OF THREADS USING THREAD SWITCHING ON EXECUTION TIME-OUT USING INSTRUCTION RE-WRITE

CROSS-REFERENCE TO RELATED APPLICATION

This application is based upon and claims the benefit of priority of prior Japanese Patent Application No. 2015-095939, filed on May 8, 2015, the entire contents of which are incorporated herein by reference.

FIELD

The technologies disclosed herein are related to a system, a method of executing a plurality of threads included in a computer program by circuitry, and one or more non-transitory computer-readable medium.

BACKGROUND

Conventionally, as a technique for multi-threading that executes a program while switching a plurality of threads, a multi-threaded processor having a time-out register is suggested. In the multi-threaded processor, when an active thread is executed over an allowable period of time for a program, thread switching is forcibly conducted.

As an example of the related art, Japanese National Publication of International Patent Application No. 2001-521216 and Japanese National Publication of International Patent Application No. 2001-521215 are known.

SUMMARY

According to an aspect of the invention, a system configured to execute a plurality of threads included in a computer program, the system includes circuitry configured to execute a first thread of the plurality of threads, measure an execution time period during which the circuitry executes the first thread without executing other threads of the plurality of threads, determine whether the measured execution time period exceeds a threshold value, specify first address information of a first instruction which is included in the first thread when it is determined that the measured execution time period exceeds the threshold value, the first instruction being an instruction that is scheduled to be executed by the circuitry, exchange the first instruction stored in an address region specified by the first address information with a second instruction instructing the circuitry to switch from executing the first thread to executing a second thread of the plurality of threads, and switch from executing the first thread to the executing the second thread by executing the second instruction.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

In multi-threading, as a scheme for making the best use of CPU resources that become available due to I/O processing or the like, a method for executing a light weight thread (LWT) with relatively less processing per thread is known. In the LWT, since a number of threads which is significantly greater than the number of threads capable of being executed simultaneously by hardware are generated and a process is progressed with high multiplexity while switching the threads to be executed, a thread switching frequency is high.

As in the related art, it takes time to switch the threads in a scheme for generating an interrupt at time-out. In particular, in the LWT having a high thread switching frequency, the thread switching time becomes a heavy burden on the entire execution time of a program.

Hereinafter, an example of an embodiment related to the disclosed technique will be described in detail with reference to the accompanying drawings.

First, a program execution by Light Weight Thread (LWT) and problems in thread switching in the LWT will be described, prior to the description of details of the embodiments.

Figure 1:
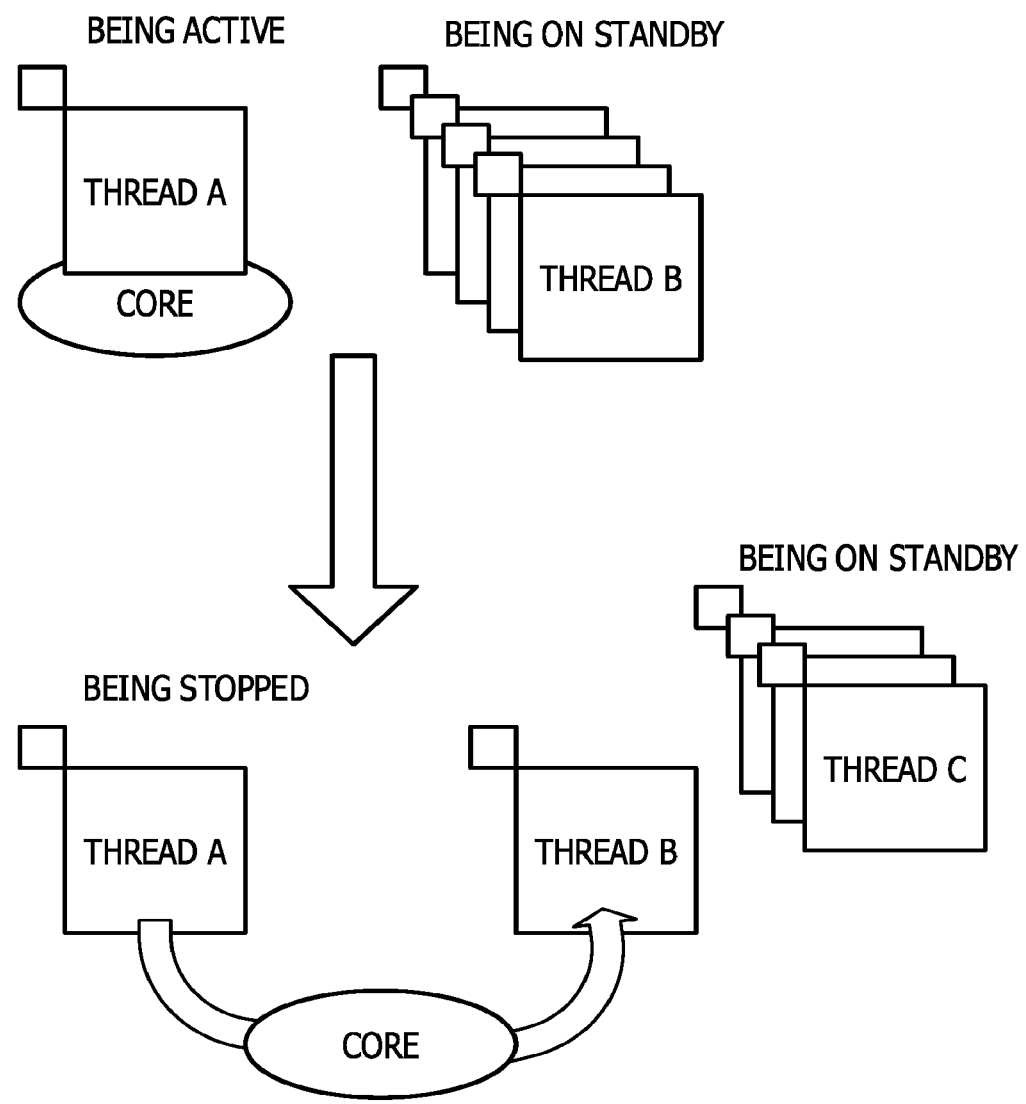
FIG. 1 is a diagram for explaining thread switching in multi-threading.

FIG. 1 is a diagram for explaining the thread switching in multi-threading. For example, in a case where the LWT is executed by a multi-core CPU, a number of threads which is significantly greater than the number of cores are generated in the LWT and a program is executed while switching the threads that are executed by each core. For example, as illustrated in FIG. 1, it is assumed that a thread A is executed by a certain core and a thread B, a thread C, and the like are on standby. In the thread A, the core may enter standby mode for processing in a memory or a disk due to an occurrence of I/O processing or the like. In such a case, in order to effectively utilize the core, the execution of the thread A is stopped in the core, and the core is allocated to any (the thread B in the example of FIG. 1) of the standby threads.

Figure 2:
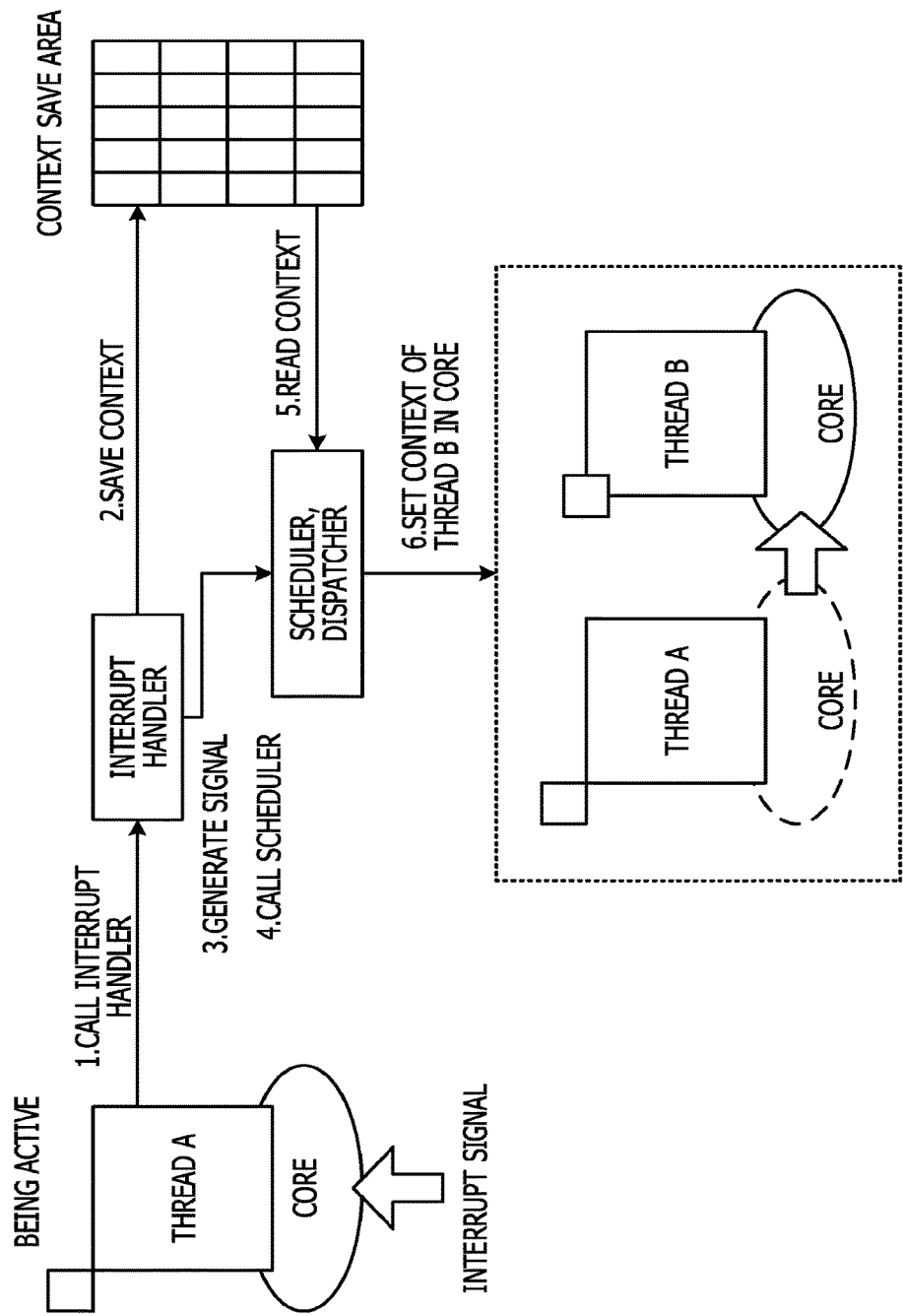
FIG. 2 is a diagram for explaining the thread switching using interrupt processing.

FIG. 2 is a diagram for explaining the thread switching using interrupt processing. For example, in a case where the thread A is being executed while occupying a certain core for a long time, since the execution of other standby threads is delayed, the thread is desired to be forcibly switched. In such a case, as illustrated in FIG. 2, a method for forcibly switching a thread by generating an interrupt signal at a predetermined timing set by a timer or the like may be considered, as a thread switching method. In the method, the thread switching is realized in accordance with, for example, the following sequences of procedure. (1). A core that has received an interrupt signal calls an interrupt handler, (2). The interrupt handler saves a context of the thread A in a context save area, (3). The interrupt handler generates a signal for calling a scheduler, (4). The interrupt handler sends the generated signal and calls the scheduler, (5). The scheduler determines a thread to be executed next (thread B) and a dispatcher reads a context of the thread B from the context save area, and (6). The dispatcher sets the read context to the core.

With this, the thread B is executed in a target core. That is, a thread to be executed in the target core is switched from the thread A to the thread B.

However, as described above, the thread switching using the interrupt processing includes many procedural sequences and takes a lot of time. The LWT has a high thread switching frequency and thus, if a lot of time is desired for the thread switching, the performance of the whole program executed by the LWT is reduced.

In the following embodiments, a location of an instruction that will be executed in the future by a thread being executed while occupying a core for a long time is rewritten into a scheduler call instruction to thereby make the number of procedural sequences of the thread switching smaller and achieve a reduction in the time desired for the thread switching. Hereinafter, embodiments will be described in detail. In the embodiments described below, an example will be described in which the disclosed technique is adopted for a case where an application program is executed using multithreading by the LWT in a computer equipped with a multi-core CPU.

First Embodiment

Figure 3:
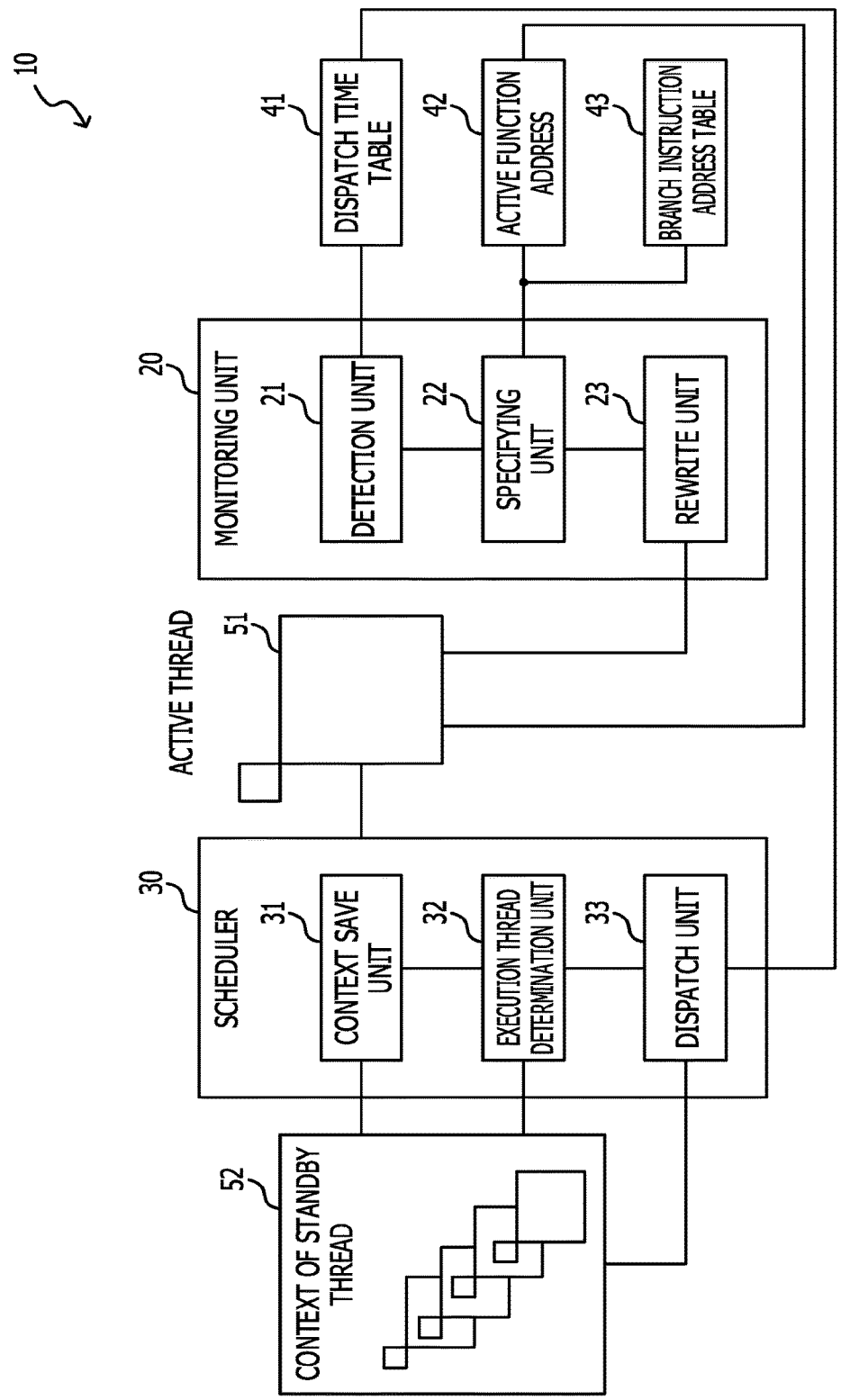
FIG. 3 is a diagram illustrating a schematic configuration of a multi-thread processing device according to a first embodiment.

FIG. 3 is a diagram illustrating a schematic configuration of a multi-thread processing device according to a first embodiment. As illustrated in FIG. 3, a multi-thread processing device 10 according to the first embodiment includes a monitoring unit 20 and a scheduler 30.

The scheduler 30 is a scheduler optimized for LWT and is a user level scheduler which may be called without switching a memory within the same process as a thread being executed. The scheduler 30 includes a context save unit 31, an execution thread determination unit 32, and a dispatch unit 33.

The context save unit 31 saves a context of a thread being executed (active thread 51) by a target core which has called the scheduler 30. For example, the context save unit 31 saves, in a stack area, data stored in a register of the target core. The context save unit 31 saves, in a dedicated save area, a stack pointer stored in a stack pointer register of the target core.

The execution thread determination unit 32 refers to a context 52 of a standby thread saved in the context save area and determines a thread to be executed next. The method for determining the thread to be executed next depends on an application program which is to be executed. The context save area includes the above-described stack area and dedicated save area where the stack pointer is stored.

The dispatch unit 33 dispatches the target core to the thread determined by the execution thread determination unit 32. For example, the dispatch unit 33 reads the context of the determined thread from the context save area and sets the context to the target core. For example, the dispatch unit 33 reads, with respect to the determined thread, a stack pointer stored in the dedicated save area and sets the stack pointer in the stack pointer register of the target core. The dispatch unit 33 reads, with respect to the determined thread, data stored in the stack area and sets the read data in the register of the target core.

Further, the dispatch unit 33 records a time at which the target core is dispatched to the determined thread in a dispatch time table 41 in which a time at which a core is dispatched to an active thread is recorded. The dispatch time table 41 is saved in a predetermined storage area (third storage area) of a memory area.

The monitoring unit 20 is a functional unit which is executed in a dedicated core separately from a core which executes an application program. The monitoring unit 20 includes a detection unit 21, a specifying unit 22, and a rewrite unit 23. The monitoring unit 20 is an example of an arithmetic device of the disclosed technique.

The detection unit 21 repeatedly refers to the dispatch time table 41 constantly or at sufficiently short intervals and detects a thread, for which the difference between a time recorded in the dispatch time table 41 and the current time is greater than or equal to a specified time, as a thread which occupies a core for a long time. The detection unit 21 notifies the specifying unit 22 of the detected thread as a thread to be switched which becomes a target to be switched to other standby threads.

The specifying unit 22 estimates an instruction that will be executed in the future by the thread to be switched, based on an instruction which is being executed or was executed in the past by the thread to be switched which is notified from the detection unit 21, and specifies an address of a memory area in which the estimated instruction is stored.

In the application program being active, an active function address 42 is saved in a first storage area before or after the function call instruction included in the application program is executed. The active function address 42 is an address of a memory area in which the function called most recently in the active thread is saved. The application program may be set such that the active function address 42 is saved in the first storage area during compilation of an application program. Further, an address of the memory area in which a branch instruction included in each function which is included in the application program is saved is acquired during compilation of the application program. The acquired address of the branch instruction is associated with the address of the functions including the branch instruction and the addresses are stored in a second storage area of the memory area as a branch instruction address table 43.

The specifying unit 22 refers to the active function address 42 saved in the first storage area and specifies an address of a function called by a thread to be switched. Further, the specifying unit 22 refers to the branch instruction address table 43 saved in the second storage area and specifies an address of the branch instruction included in the specified function. The specifying unit 22 notifies the rewrite unit 23 of the address of the specified branch instruction.

Meanwhile, specifying of the branch instruction as an instruction that will be executed in the future by the thread to be switched is based on an idea that a process is executed in a loop by the branch instruction which will result in a core being occupied for a long time by a thread to be switched.

In a case where a process is executed in a loop by a branch instruction, the branch instruction is highly likely to be executed again and thus, the branch instruction is estimated as an instruction that will be executed in the future. However, since an instruction included in the specified function is likely to be executed in the future by the thread to be switched, an instruction other than the branch instruction may be specified as the instruction that will be executed in the future by the thread to be switched. As described above, since the instruction that will be executed in the future by the thread to be switched is estimated by assuming a loop in a process, a branch instruction may be specified by being limited to the end of loop among the branch instructions.

The rewrite unit 23 rewrites a location where the specified branch instruction is saved in the memory area into a call instruction of the scheduler 30, based on the address of the branch instruction specified by the specifying unit 22. In a case where a plurality of addresses of the branch instructions are specified by the specifying unit 22, the rewrite unit 23 may rewrite all the specified branch instructions or otherwise, may rewrite some of the specified branch instructions. In a case where some of the specified branch instructions are rewritten, for example, it is possible to rewrite sequentially a predetermined number of branch instructions placed at the rear in the order of execution among the specified branch instructions. This is because a branch instruction placed early in the order of execution is likely to have been executed in the active thread and a branch instruction placed at the rear in the order of execution is highly likely to be a branch instruction that will be executed in the future.

Figure 4:
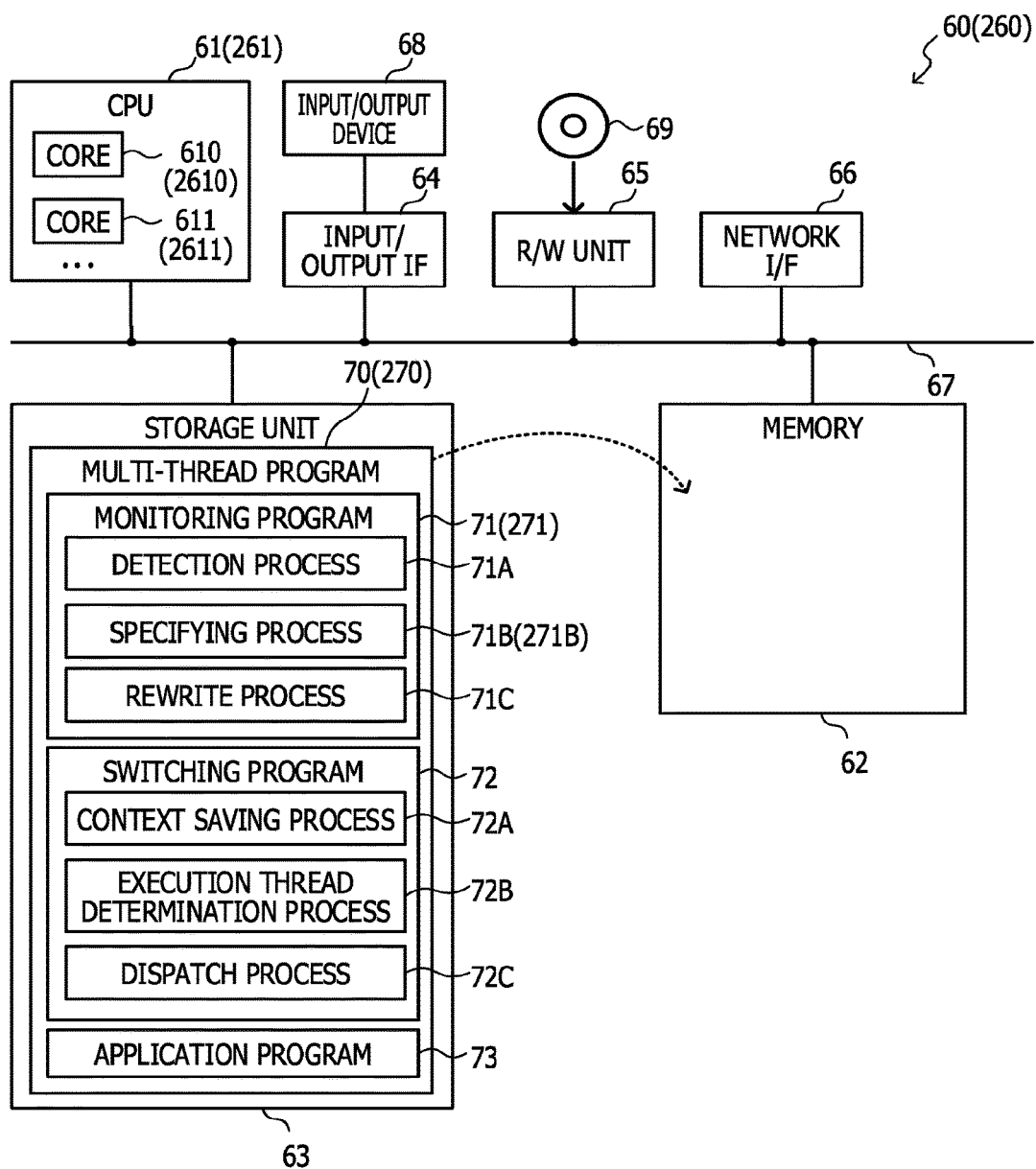
FIG. 4 is a diagram illustrating a schematic configuration of a computer that functions as the multi-thread processing device according to the first embodiment.

FIG. 4 is a diagram illustrating a circuit schematic configuration of a computer that functions as the multi-thread processing device according to the first embodiment. The multi-thread processing device 10 is realized by, for example, a computer 60 illustrated in FIG. 4. The computer 60 includes a CPU 61 including a plurality of cores 610, 611, and so on, a memory 62 as a temporary storage area, and a non-volatile storage unit 63. The computer 60 includes an input/output interface (I/F) 64 to which an input/output device 68 such as a display device and an input device is coupled. The computer 60 includes a read/write (R/W) unit 65 that controls data read and data write for a recording medium 69, and a network I/F 66 coupled to a network such as the Internet. The CPU 61, the memory 62, the storage unit 63, the input/output I/F 64, the R/W unit 65, and the network I/F 66 are coupled to each other via a bus 67.

The storage unit 63 is realized by a hard disk drive (HDD), a solid state drive (SSD), a flash memory, or the like. A multi-thread program 70 for causing the computer 60 to function as the multi-thread processing device 10 is stored in the storage unit 63 which serves as a storage medium.

The multi-thread program 70 includes a monitoring program 71 for causing any of the cores included in the CPU 61 to function as the monitoring unit 20. The multi-thread program 70 includes a switching program 72 for causing any of the cores included in the CPU 61 to function as the scheduler 30, and an application program 73. In the first embodiment, a core which functions as the monitoring unit 20 is referred to as the core 610, and a core which executes an application program and functions as the scheduler 30 is referred to as the core 611.

The core 610 reads the monitoring program 71 from the storage unit 63, develops the monitoring program 71 in the memory 62, and executes a process included in the monitoring program 71 sequentially. The core 611 reads the application program 73 from the storage unit 63, develops the application program 73 in the memory 62, and sequentially executes a process included in the application program 73. The core 611 reads the switching program 72 from the storage unit 63, develops the switching program 72 in the memory 62, and sequentially executes a process included in the application program 73.

The monitoring program 71 includes a detection process 71A, a specifying process 71B, and a rewrite process 71C. The core 610 operates as the detection unit 21 illustrated in FIG. 3 by executing the detection process 71A. The core 610 operates as the specifying unit 22 illustrated in FIG. 3 by executing the specifying process 71B. The core 610 operates as the rewrite unit 23 illustrated in FIG. 3 by executing the rewrite process 71C.

The switching program 72 includes a context saving process 72A, an execution thread determination process 72B, and a dispatch process 72C. The core 611 operates as the context save unit 31 illustrated in FIG. 3 by executing the context saving process 72A. The core 611 operates as the execution thread determination unit 32 illustrated in FIG. 3 by executing the execution thread determination process 72B. The core 611 operates as the dispatch unit 33 illustrated in FIG. 3 by executing the dispatch process 72C.

Further, a context save area which saves a context 52 of the standby thread described above is provided in the memory 62. A third storage area in which the dispatch time table 41 is saved, a first storage area in which the active function address 42 is saved, and a second storage area in which the branch instruction address table 43 is saved are provided in the memory 62.

With this, the computer 60 which has executed the multi-thread program 70 functions as the multi-thread processing device 10.

A functionality implemented by the multi-thread program 70 may be realized also by, for example, a semiconductor integrated circuit, more specifically, an application specific integrated circuit (ASIC), or the like.

Next, the operation of the multi-thread processing device 10 according to the first embodiment will be described. In the multi-thread processing device 10, when the application program 73 starts to be executed, the monitoring unit 20 executes a monitoring process illustrated in FIG. 5. The monitoring process is an example of a thread switching method of the disclosed technique.

Figure 5:
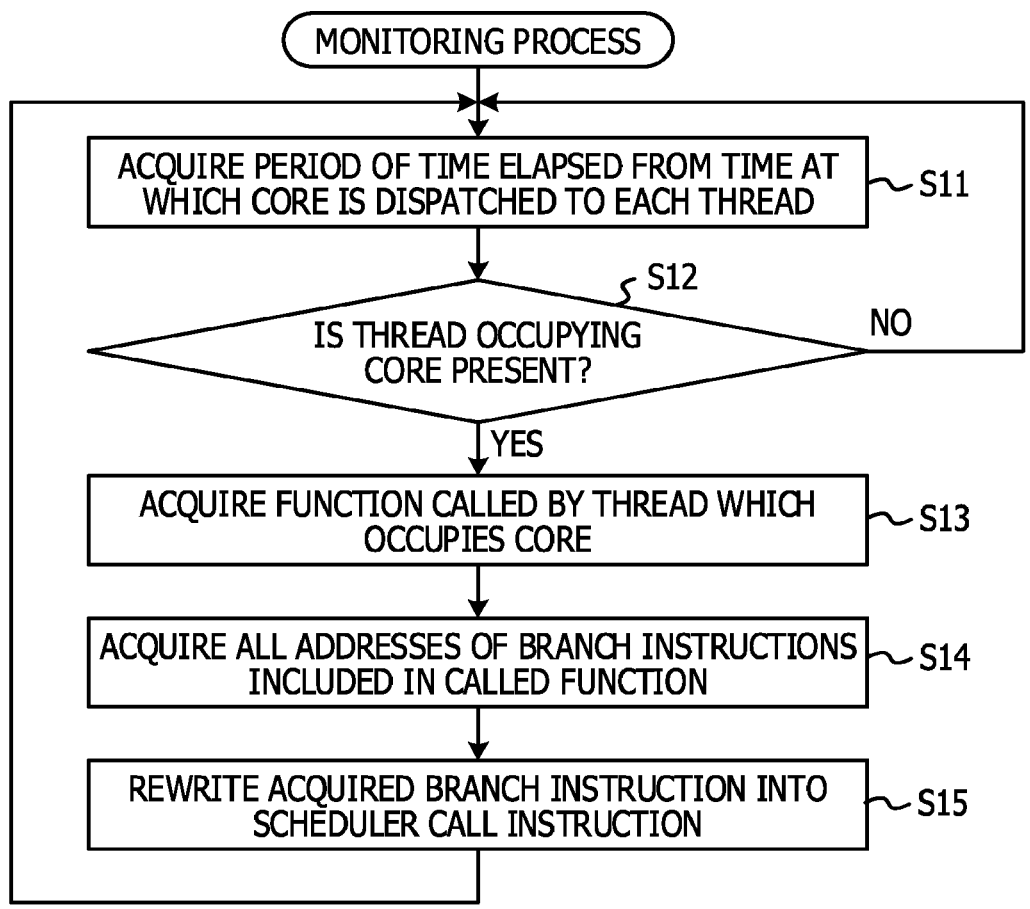
FIG. 5 is a flowchart illustrating an example of a monitoring process.
Figure 6:
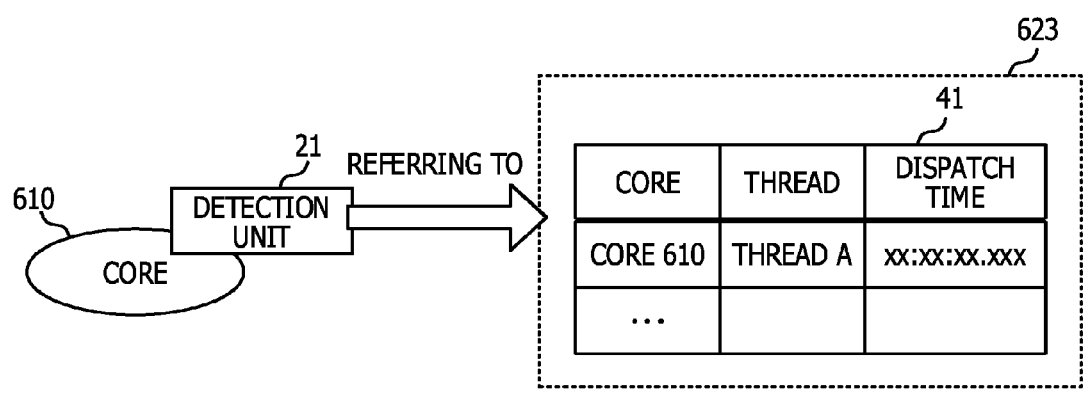
FIG. 6 is a diagram for explaining a process in a detection unit.
Figure 7:
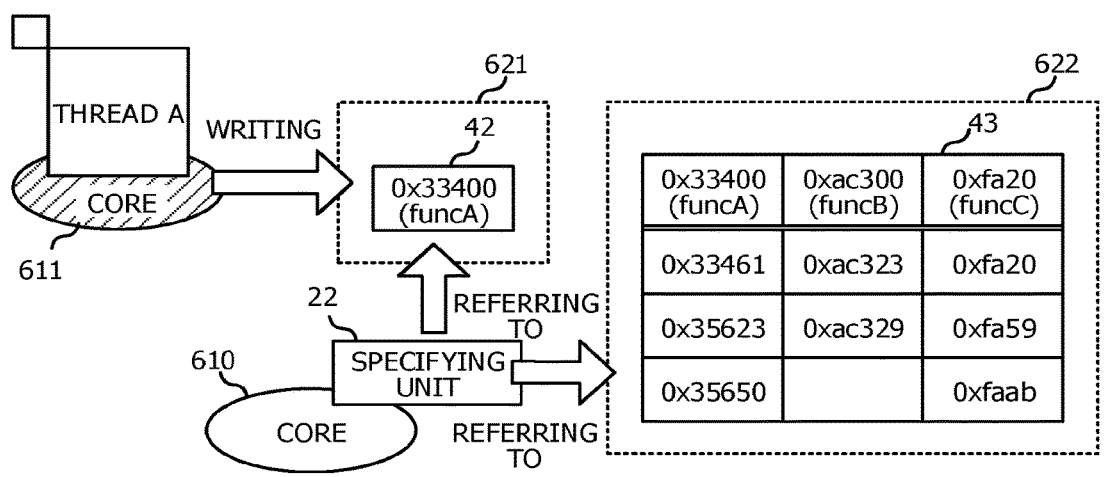
FIG. 7 is a diagram for explaining a process in a specifying unit.
Figure 8:
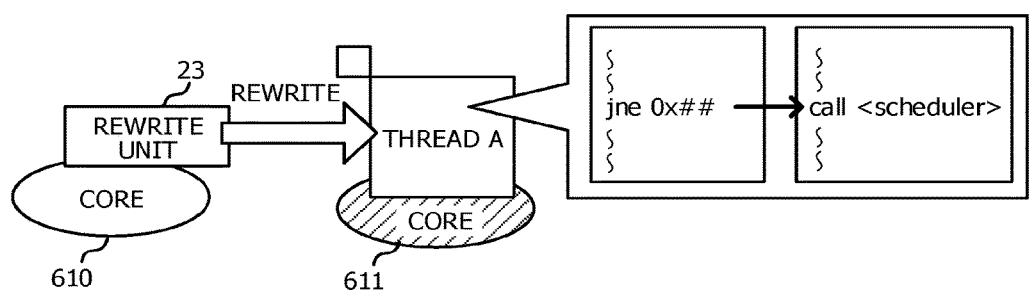
FIG. 8 is a diagram for explaining a process in a rewrite unit.
Figure 9:
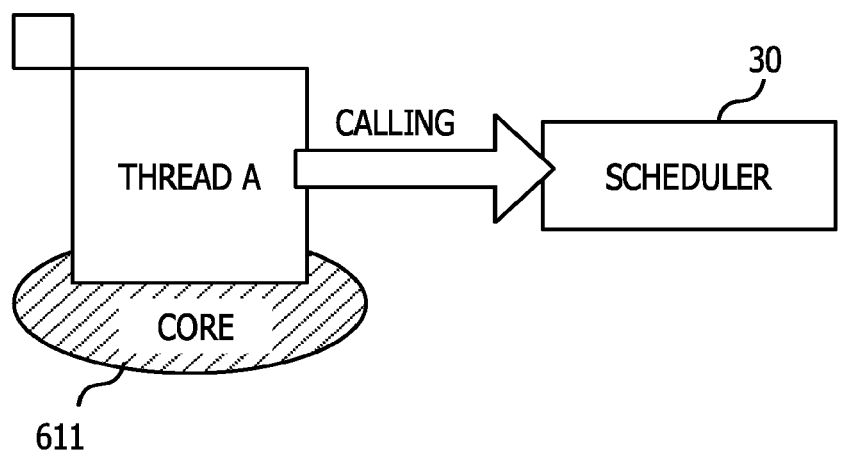
FIG. 9 is a diagram for explaining a scheduler call.
Figure 10:
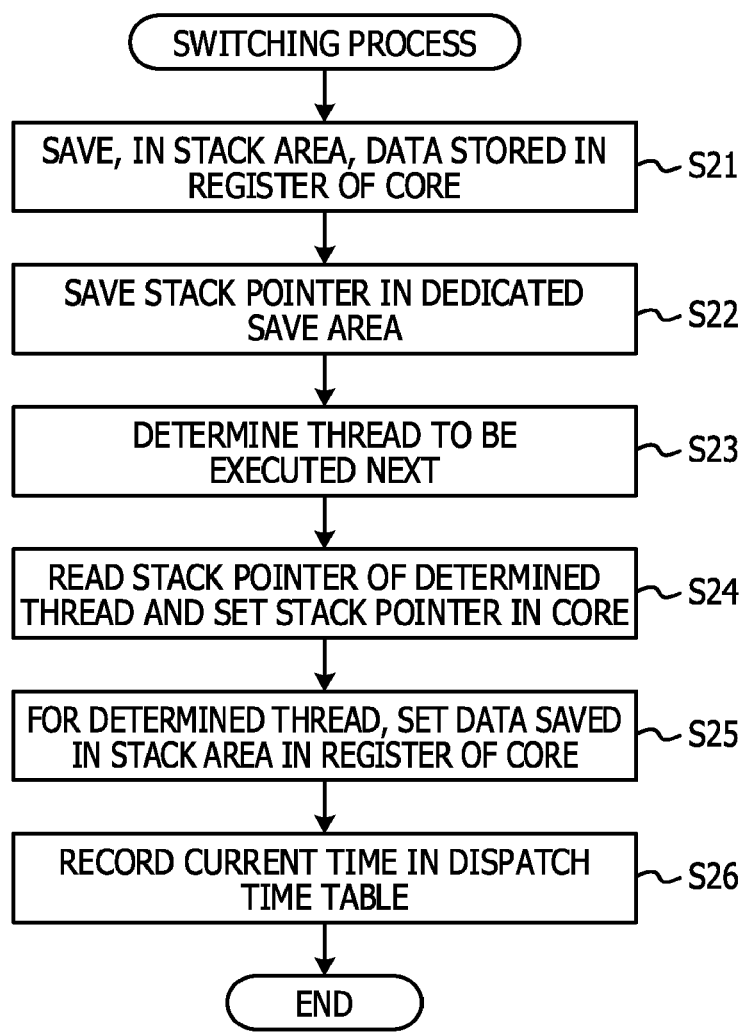
FIG. 10 is a flowchart illustrating an example of a switching process.
Figure 11:
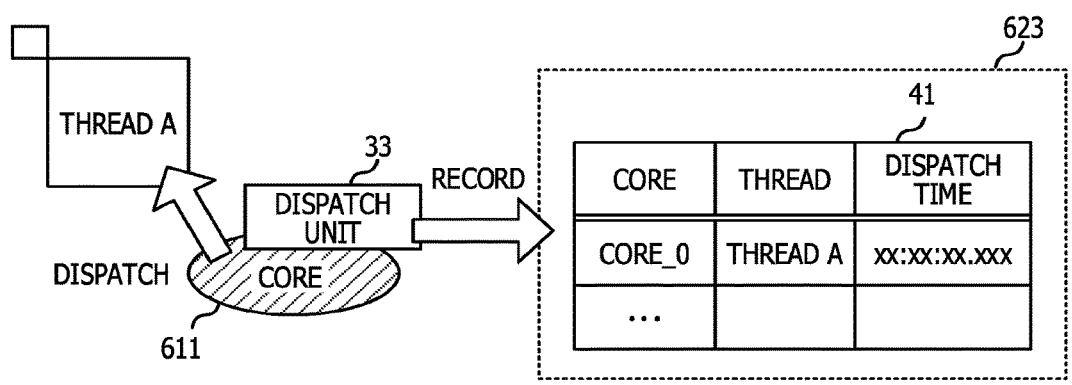
FIG. 11 is a diagram for explaining a process in a dispatch unit.

FIG. 5 is a flowchart illustrating an example of a monitoring process. FIG. 6 is a diagram for explaining a process in a detection unit. FIG. 7 is a diagram for explaining a process in a specification unit. FIG. 8 is a diagram for explaining a process in a rewrite unit. FIG. 9 is a diagram for explaining a scheduler call. FIG. 10 is a flowchart illustrating an example of a switching process. FIG. 11 is a diagram for explaining a process in a dispatch unit. In step S11 of the monitoring process illustrated in FIG. 5, the detection unit 21 repeatedly refers to the dispatch time table 41, which is stored in a third storage area 623, constantly or at sufficiently short intervals as illustrated in FIG. 6. In the dispatch time table 41, a time at which a core is dispatched, by the dispatch unit 33 of the scheduler 30, to an active thread is saved in the switching process which will be described below. In the dispatch time table 41 illustrated in FIG. 6, an example in which items for a "core", a "thread", and a "dispatch time" are included is illustrated, but the dispatch time table 41 is not limited thereto, and may be a table in which a time elapsed from the time at which a core is dispatched to an active thread is capable of being grasped. The detection unit 21 acquires a difference between a dispatch time recorded in the dispatch time table 41 and the current time, that is, a time elapsed from the time at which a core is dispatched to each thread.

Next, in step S12, the detection unit 21 determines whether a thread occupying a core for a long time is present. In a case where a thread for which the time acquired in step S11 is greater than or equal to a specified time, which is determined in advance, is present, the detection unit 21 detects the thread as a thread to be switched and notifies the specifying unit 22 of the thread, and the process proceeds to step S13. In a case where a thread occupying a core for a long time is not present, the process returns to step S11.

In step S13, the specifying unit 22, as illustrated in FIG. 7, refers to the active function address 42 saved in the first storage area 621 and acquires an address of a function called by the thread to be switched which is notified from the detection unit 21. The first storage area 621 is set such that the address of the function called most recently in the active thread is saved during compilation of an application program 73.

In step S14, the specifying unit 22 acquires all of the addresses of the branch instructions in association with addresses of the functions acquired in step S13 in the branch instruction address table 43 saved in a second storage area 622. The specifying unit 22 notifies the rewrite unit 23 of the acquired addresses of the branch instructions.

In step S15, the rewrite unit 23 rewrites a location where the specified branch instruction is saved in the memory area into a call instruction of the scheduler 30, based on the address of the branch instruction notified from the specifying unit 22 as illustrated in FIG. 8. The monitoring process returns to step S11.

When the call instruction of the scheduler 30 rewritten in step S15 of the monitoring process is executed in the thread to be switched, the scheduler 30 is directly called from the active thread as illustrated in FIG. 9. The scheduler 30 then executes the switching process illustrated in FIG. 10.

In step S21 of the switching process illustrated in FIG. 10, the context save unit 31 saves, in a stack area, data stored in a register of a target core, which is executing the thread to be switched. In step S22, the context save unit 31 saves a stack pointer stored in a stack pointer register of the target core in a dedicated save area.

In step S23, the execution thread determination unit 32 refers to the context 52 of a standby thread saved in the context save area and determines a thread to be executed next.

In step S24, the dispatch unit 33 reads the stack pointer stored in the dedicated save area for the thread determined by the execution thread determination unit 32 and sets the stack pointer in the stack pointer register of the target core. In step S25, the dispatch unit 33 reads data stored in the stack area with respect to the determined thread and sets the read data in the register of the target core.

In step S26, the dispatch unit 33 records the current time in the dispatch time table 41, which is stored in a third storage area 623, as a time at which the target core is dispatched to the determined thread, as illustrated in FIG. 11. Then, the switching process ends.

As described above, according to the multi-thread processing device 10 according to the first embodiment, a location of an instruction that will be executed in the future by the thread which occupies the core for a long time is rewritten into the scheduler call instruction. It is possible to directly call the scheduler from the thread to be switched by executing the rewritten instruction. Since the number of processes for the thread switching is smaller as compared to a case where the thread switching is executed by the interrupt processing, the time desired for the thread switching is shortened in the multi-threading.

Second Embodiment

Next, a second embodiment will be described. In the second embodiment, a method for specifying an instruction that will be executed in the future by the thread to be switched is different from that in the first embodiment. Regarding a multi-thread processing device according to the second embodiment, the same parts as those of the multi-thread processing device 10 according to the first embodiment are assigned the same reference numerals, and descriptions thereof will not be repeated.

Figure 12:
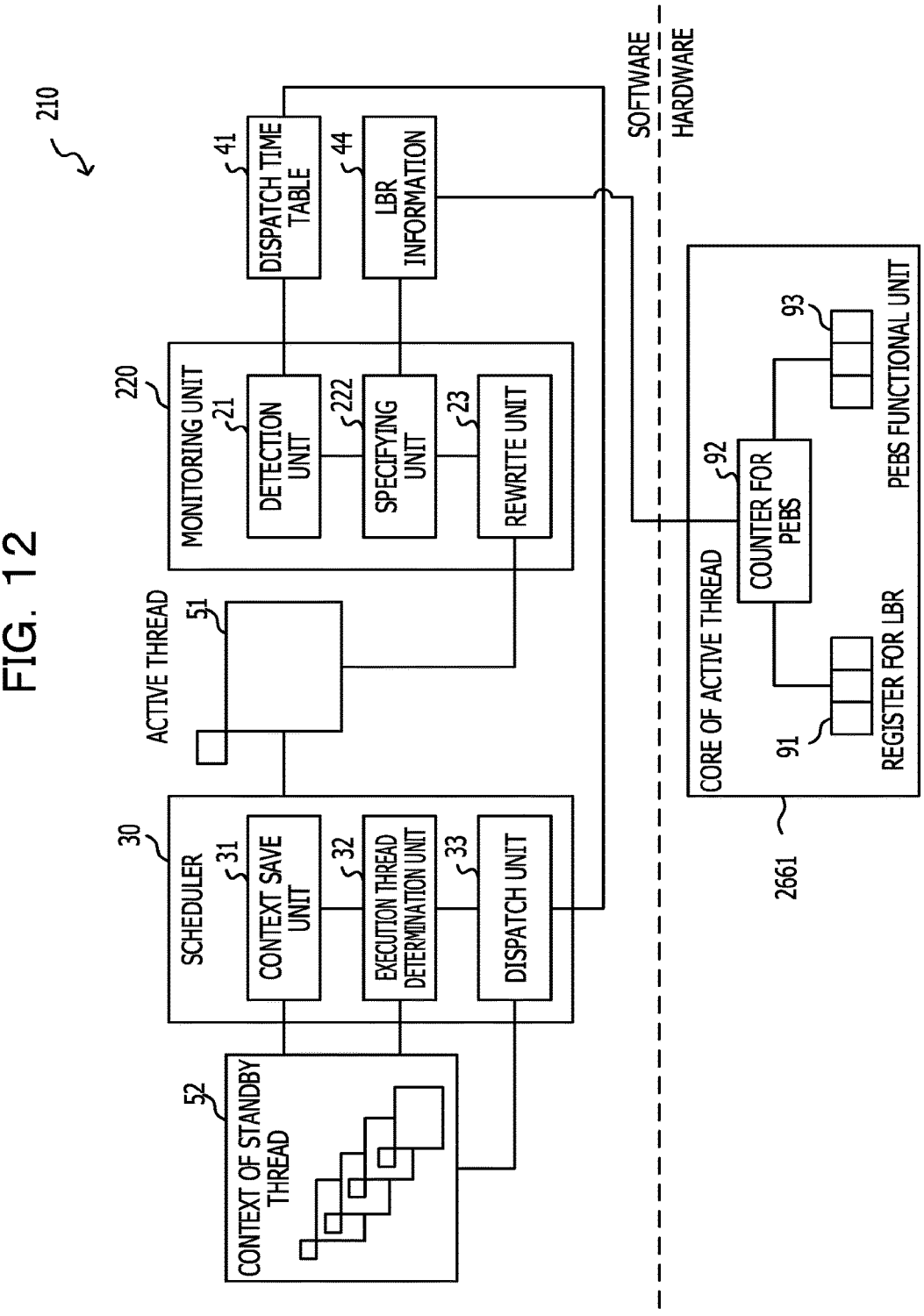
FIG. 12 is a diagram illustrating a schematic configuration of a multi-thread processing device according to a second embodiment.

FIG. 12 is a diagram illustrating a schematic configuration of a multi-thread processing device according to the second embodiment. As illustrated in FIG. 12, a multi-thread processing device 210 according to the second embodiment includes a monitoring unit 220 and the scheduler 30. The monitoring unit 220 includes the detection unit 21, a specifying unit 222, and the rewrite unit 23.

In the multi-thread processing device 210 according to the second embodiment, each core included in the multi-core CPU includes a register for Last Branch Record (LBR) 91, a Precise Event Based Sampling (PEBS) functional unit 92, and a counter for PEBS 93 as a hardware configuration, as illustrated in FIG. 12. In the register for LBR 91, the address of the branch instruction executed most recently by the thread being executed by the core is obtained by an LBR functionality and is saved. The PEBS functional unit 92 is a functional unit that extracts information stored in a hardware area to be capable of being referred to in a software area. Information that designates data to be extracted (here, information that designates the register for LBR 91) by the PEBS functional unit 92 is saved in the counter for PEBS 93. By linking of the LBR functionality and the PEBS functionality, the address of the branch instruction executed most recently by the thread being executed by the core is regularly obtained and is saved in a predetermined area (fourth storage area) of the memory area as LBR information 44.

The specifying unit 222 refers to the LBR information 44 saved in the fourth storage area and specifies an address indicated by the LBR information as the address of the instruction that will be executed in the future by the thread to be switched.

The multi-thread processing device 210 is realized by, for example, a computer 260 illustrated in FIG. 4. The computer 260 includes a CPU 261 including a plurality of cores 2610, 2611, and so on, the memory 62, and the storage unit 63. The computer 260 includes the input/output I/F 64 to which the input/output device 68 is coupled, the R/W unit 65 that controls data read and data write for the recording medium 69, and the network I/F 66. The CPU 261, the memory 62, the storage unit 63, the input/output I/F 64, the R/W unit 65, and the network I/F 66 are coupled to each other via the bus 67. Each of the cores 2610, 2611, and so on includes the register for LBR 91, the PEBS functional unit 92, and the counter for PEBS 93 as described above. In the second embodiment, a core which functions as the monitoring unit 220 is referred to as the core 2610, and a core which executes an application program and functions as the scheduler 30 is referred to as the core 2611.

A multi-thread program 270 for causing the computer 260 to function as the multi-thread processing device 210 is stored in the storage unit 63. The multi-thread program 270 includes a monitoring program 271, the switching program 72, and the application program 73. The monitoring program 271 includes the detection process 71A, a specifying process 271B, and the rewrite process 71C. The core 2610 operates as the specifying unit 222 illustrated in FIG. 12 by executing the specifying process 271B. Other processes are the same as those of the multi-thread program 70 in the first embodiment.

Further, the fourth storage area in which the LBR information 44 described above is saved is provided in the memory 62. The computer 260 which has executed the multi-thread program 270 functions as the multi-thread processing device 210.

The functionality implemented by the multi-thread program 270 may also be realized by, for example, a semiconductor integrated circuit, more specifically, an ASIC, or the like.

In the operation of the multi-thread processing device 210 according to the second embodiment, a method for specifying an instruction that will be executed in the future by the thread to be switched is different from that in the first embodiment. For example, in the second embodiment, the specifying unit 222 refers to the LBR information 44 saved in the fourth storage area and specifies an address indicated by the LBR information as the address of the instruction that will be executed in the future by the thread to be switched, in steps S13 and S14 of the monitoring process (FIG. 5) in the first embodiment.

As described above, in the multi-thread processing device 210 according to the second embodiment, the instruction that will be executed in the future by the thread to be switched is specified using the existing functionality provided in the hardware configuration, thereby acquiring the same effect as that of the first embodiment.

Figure 13:
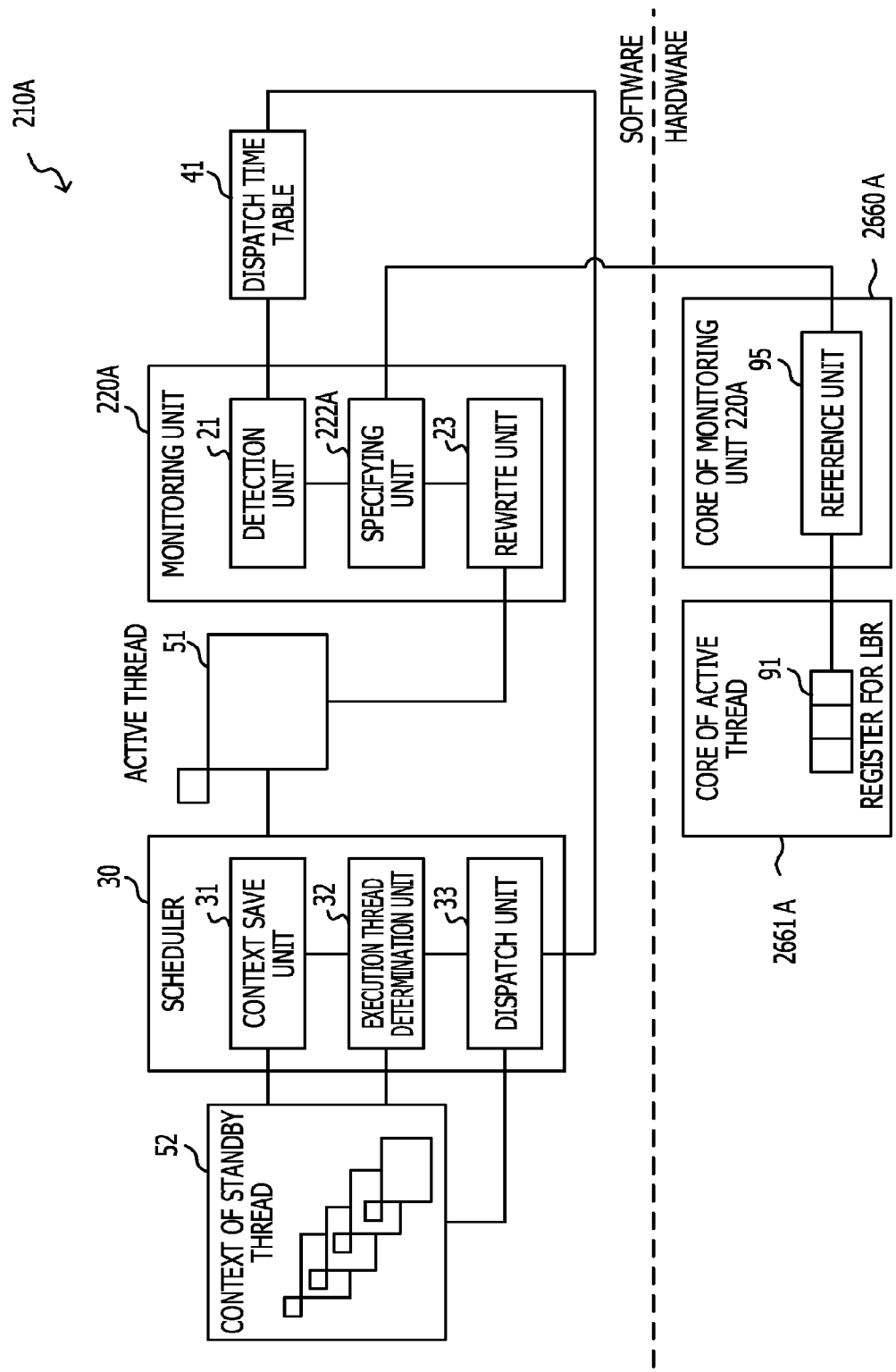
FIG. 13 is a diagram illustrating a schematic configuration of a multi-thread processing device according to a modified example of the second embodiment.

As a modified example of the second embodiment, another example in which the functionality provided in the hardware configuration is used is illustrated in FIG. 13.

FIG. 13 illustrates a schematic configuration of a multi-thread processing device according to the modified example of the second embodiment. The monitoring unit 220A of the multi-thread processing device 210A illustrated in FIG. 13 includes the detection unit 21, a specifying unit 222A, and the rewrite unit 23.

A core 2661A which executes a thread includes the register for LBR 91 as a hardware configuration. The core 2660A which functions as the monitoring unit 220A includes a reference unit 95 which refers to data saved in a register included in other cores as a hardware configuration. The reference unit 95 refers to the register for LBR 91 in the core 2661A which is executing a thread in the modified example.

When a thread to be switched is notified from the detection unit 21, the specifying unit 222A causes the reference unit 95 to function and refers to the register for LBR 91 in the core 2661A which is executing a thread to be switched and acquires the LBR information 44. Other processes are the same as those in the second embodiment.

According to the modified example, since it is possible to specify an instruction that will be executed in the future by directly referring to the register for LBR 91 in the core 2661A which is executing a thread to be switched, a storage area for saving the LBR information 44 may not be provided or secured in the memory area.

In the above descriptions, an aspect in which the multi-thread programs 70 and 270 are stored (installed) in the storage unit 63 in advance has been described, but the present disclosure is not limited thereto. A program related to the disclosed technique may be provided by being recorded in a recording medium such as a CD-ROM, a DVD-ROM, and a USB memory.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A system configured to execute a plurality of threads included in a computer program, the system comprising:
a memory; and
a hardware processor coupled to the memory and configured to
detect a first thread to be switched from among the plurality of threads based on an execution status for each of the plurality of threads,
acquire a function called in the first thread by referring to active function information that includes functions called most recently in an active thread,
acquire first addresses of all of branch instructions included in the called function,
rewrite each of the branch instructions stored in a storage area of the memory corresponding to the acquired first addresses into a call instruction for executing a switching process for switching from the first thread to a second thread of the plurality of threads, and
switch from executing the first thread to executing the second thread by executing the call instruction.

2. The system according to claim 1, wherein
the execution status indicates an elapsed time since a core of the hardware processor has been dispatched to a thread of the plurality of threads.

3. The system according to claim 2, wherein the hardware processor is further configured to
obtain second addresses of the branch instructions included in the called function during the compilation of the computer program, and
specify the first addresses by referring to the second address.

4. The system according to claim 3, wherein
the hardware processor is further configured to obtain a third address of a branch instruction among the branch instructions included in the called function.

5. The system according to claim 4, wherein the hardware processor is further configured to
specify the third address of a branch instruction executed most recently, and
specify each of the branch instructions based on the third address.

6. The system according to claim 4, wherein
the hardware processor is further configured to specify the third address of the branch instruction using a Last Branch Record functionality and a Precise Event Based Sampling functionality.

7. The system according to claim 1, wherein
the hardware processor is further configured to function as a scheduler configured to switch the first thread, and
the call instruction is an instruction for calling the scheduler.

8. A method of executing a plurality of threads included in a computer program by a hardware processor, the method comprising:
- detecting a first thread to be switched from among the plurality of threads based on an execution status for each of the plurality of threads;
- acquiring a function called in the first thread by referring to active function information that includes functions called most recently in an active thread;
- acquiring first addresses of all of branch instructions included in the called function;
- rewriting each of the branch instructions stored in a storage area of the memory corresponding to the acquired first addresses into a call instruction for executing a switching process for switching from the first thread to a second thread of the plurality of threads; and
- switching from executing the first thread to the executing the second thread by executing the call instruction.

9. The method according to claim 8,
wherein the execution status indicates an elapsed time since a core of the hardware processor has been dispatched to a thread of the plurality of threads.

10. The method according to claim 9, further comprising
- obtaining second addresses of the branch instructions included in the called function during the compilation of the computer program, and
- specifying the first addresses by referring to the second address.

11. The method according to claim 10, further comprising:
- obtaining a third address of a branch instruction among the branch instructions included in the called function.

12. The method according to claim 11, wherein
the obtaining the third address includes specifying a most recently executed branch instruction, and
the method further comprising
- specifying each of the branch instructions by referring to the third address.

13. The method according to claim 11, wherein
the obtaining the third address of the branch instruction is executed by using a Last Branch Record functionality and a Precise Event Based Sampling functionality.

14. One or more non-transitory computer-readable medium configured to store computer program instructions, which when executed by a system including a hardware processor, cause the system to:
- detect a first thread to be switched from among the plurality of threads based on an execution status for each of the plurality of threads,
- acquire a function called in the first thread by referring to active function information that includes functions called most recently in an active thread,
- acquire first addresses of all of branch instructions included in the called function,
- rewrite each of the branch instructions stored in a storage area of the memory corresponding to the acquired first addresses into a call instruction for executing a switching process for switching from the first thread to a second thread of the plurality of threads, and
- switch from executing the first thread to the executing the second thread by executing the call instruction.

15. The one or more non-transitory computer-readable medium according to claim 14,
wherein the execution status indicates an elapsed time since a core of the hardware processor has been dispatched to a thread of the plurality of threads.

16. The one or more non-transitory computer-readable medium according to claim 15, wherein the computer program instructions further cause the system to:
- obtain second addresses of the branch instructions included in the called function during the compilation of the computer program, and
- specify the first addresses by referring to the second address.

17. The one or more non-transitory computer-readable medium according to claim 16, wherein the computer program instructions further cause the system to:
- obtain a third address of a branch instruction among the plurality of branch instructions included in the called function.

* * * * *